(No Model.) 3 Sheets—Sheet 2.
D. W. BOSLEY.
MACHINE FOR CUTTING FLEXIBLE MATERIAL INTO STRIPS.
No. 595,092. Patented Dec. 7, 1897.

Witnesses:

Inventor:
Daniel W. Bosley,
By Banning & Banning & Sheridan,
Att'ys (No Model.) 3 Sheets—Sheet 3.
D. W. BOSLEY.
MACHINE FOR CUTTING FLEXIBLE MATERIAL INTO STRIPS.
No. 595,092. Patented Dec. 7, 1897.
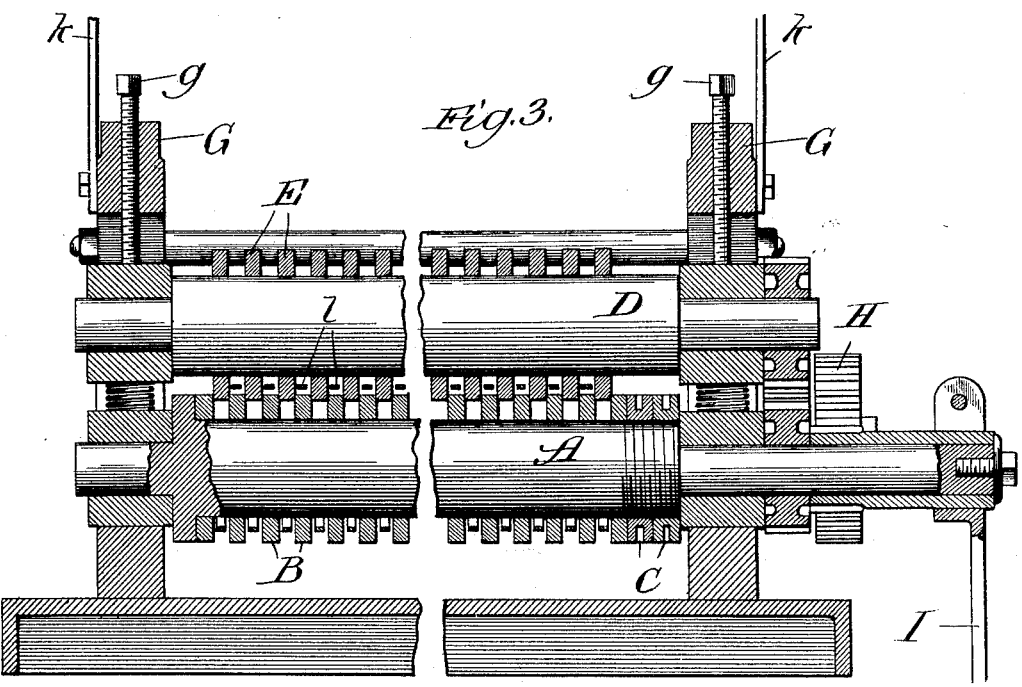
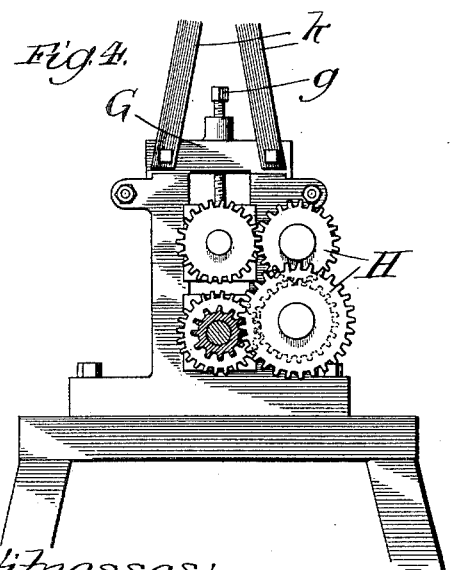
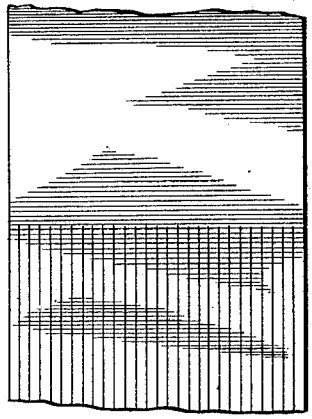
Witnesses:
Inventor:
Daniel W. Bosley,

UNITED STATES PATENT OFFICE.

DANIEL W. BOSLEY, OF CHICAGO, ILLINOIS.

MACHINE FOR CUTTING FLEXIBLE MATERIAL INTO STRIPS.

SPECIFICATION forming part of Letters Patent No. 595,092, dated December 7, 1897.

Application filed October 26, 1896. Serial No. 610,097. (No model.)

*To all whom it may concern:*

Be it known that I, DANIEL W. BOSLEY, a citizen of the United States, residing at Chicago, Cook county, Illinois, have invented certain new and useful Improvements in Machines for Cutting Sheet-Rubber and Flexible Material into Strips, of which the following is a specification.

My invention relates particularly to machines for cutting sheet-rubber into strips of the required width for use in connection with weather-strips.

The object of my invention is to provide a simple, economical, and efficient machine for cutting sheet-rubber into strips; and the invention consists in the features, combinations, and details of construction hereinafter described and claimed.

Figure 1:
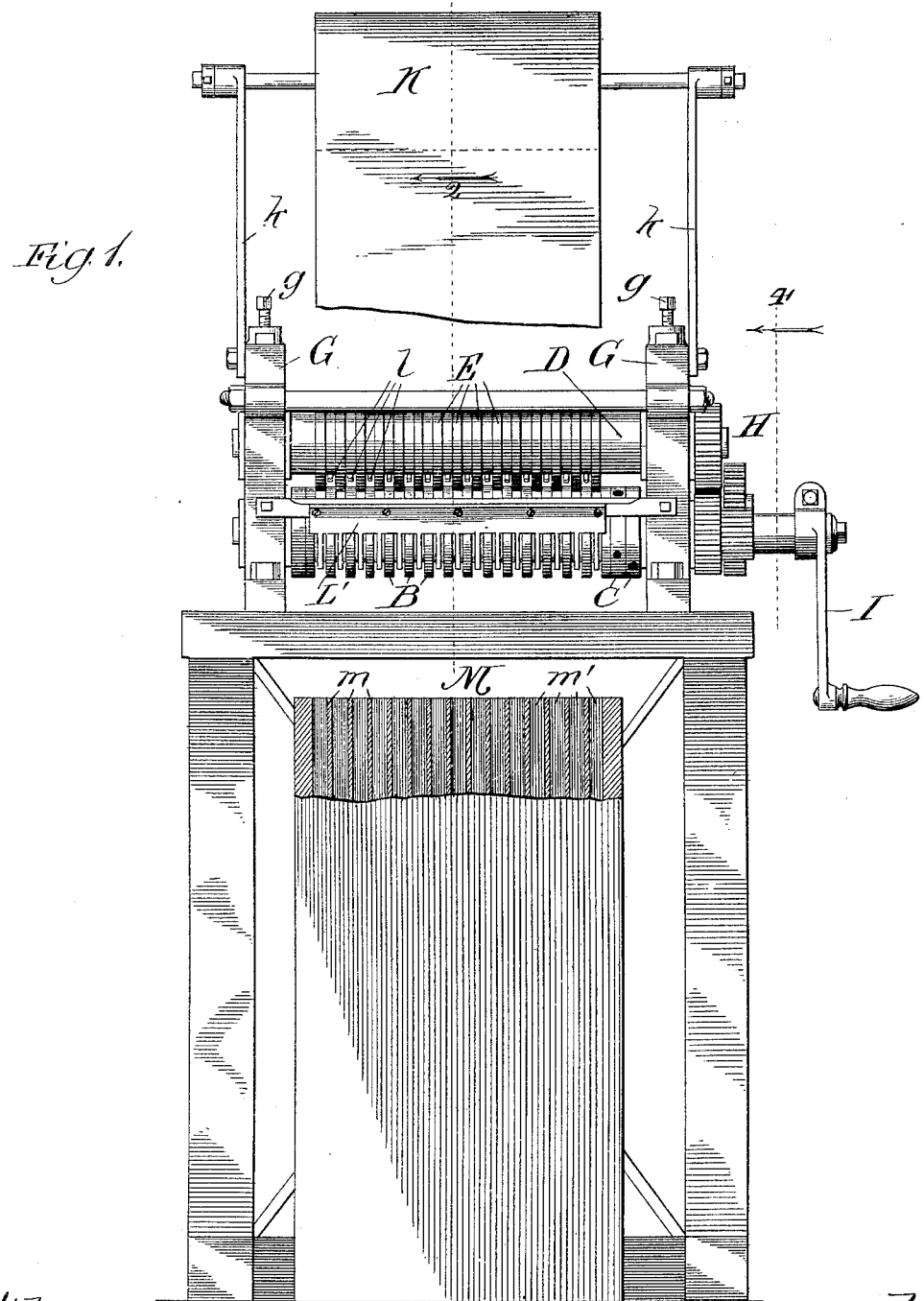
Figure 2:
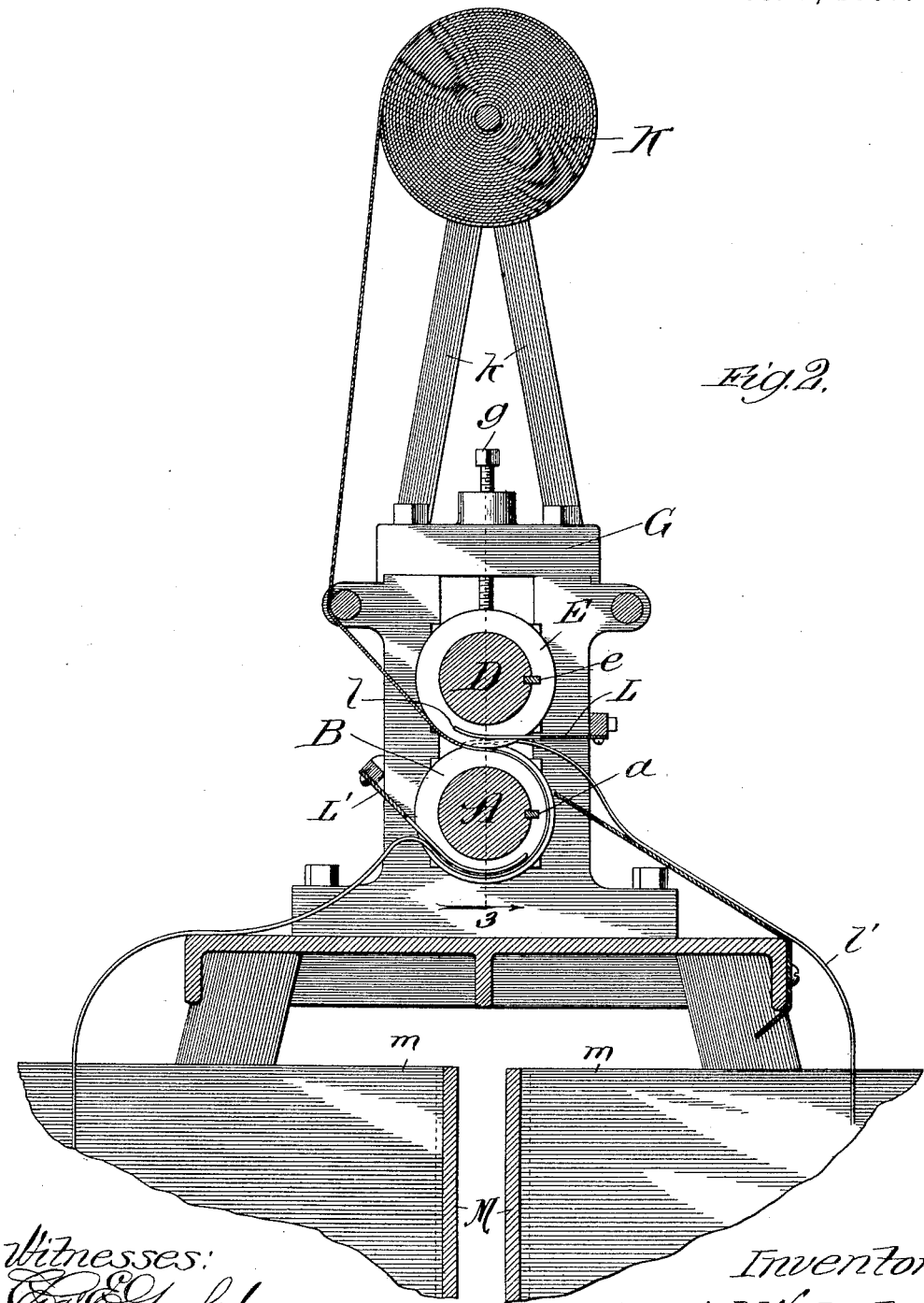

In the accompanying drawings, Figure 1 is a front elevation of a machine embodying my improvements; Fig. 2, a sectional elevation taken on the line 2 of Fig. 1; Fig. 3, a sectional front elevation taken on the line 3 of Fig. 2; Fig. 4, a side elevation of a portion of a machine, showing the driving-gears; and Fig. 5, a view of a piece of sheet-rubber partially slitted.

In the art to which this invention relates the cutting of sheet-rubber so as to form weather-strips was done by hand, or each strip was cut off singly, making the process necessarily very slow and expensive as well as laborious. Many attempts have been made to cut a sheet of rubber into strips by means of a gang of cutters, but all have failed. For some reason or other the cutters would clog and the strips bind, thus obstructing the machine, so that no economy was gained over the old method. As a consequence a return to the primitive style of shears or single cutters was necessary.

In constructing a machine in accordance with my improvements I make a spindle A of the desired length and diameter and mount upon it a set of circular disks or cutters B. The spindle is preferably provided with a key or feather $a$, and the cutters with a groove. The cutters are loosely mounted thereon—that is, they may have an independent longitudinal movement, but a common rotary movement. The spindle may be made in any way desired. I prefer to make it as shown in the drawings. This spindle is further provided with a set of jam or locking nuts C, that hold the set of cutters in position, as hereinafter described. I arrange a second spindle D in line and parallel with the first spindle and provide it with a second set or series of cutters E, which have a key and groove engagement with each other, as shown at $e$ in Fig. 2. This latter set of cutters are also loosely mounted upon the rotating supporting-shaft D, so as to have independent longitudinal and common rotary movements, and are so arranged as to intermesh slightly with the cutters of the first shaft, as shown clearly in Fig. 3. It will be seen from an examination of Fig. 3 that the position of the jam or locking nuts C determines the relative position of all the cutters, so that if the cutter be made of different thickness such fact is automatically compensated for by the jam-nuts, a point upon which I lay great stress, as it is practically the essence of the invention and makes the machine a success where hitherto there have been failures.

The rolls are mounted in suitable bearing-boxes in standards G, and are provided with adjusting-screws $g$ to regulate the depth of the intermeshing of the cutters. A train of gears H are used, as shown particularly in Fig. 4, for transmitting power and motion from the crank I.

In Fig. 2 I have shown a roll of sheet-rubber as being arranged above the machine on suitable standard $k$. This arrangement, however, may be varied to suit different circumstances and conditions. When the sheet-rubber is fed between the rolls and cut, great difficulty is encountered in distributing the slitted or cut rubber. In order to obviate this objection and distribute the cut strips, I provide a comb L, having fingers or teeth $l$, extending into spaces between the upper set of cutters, which remove or force the cut strips from the upper set of rolls, so that they fall down, as shown at $l'$, (see right hand of Fig. 2,) into a suitable box. I arrange a second cone or set of strippers L' on the opposite side of the machine, which is provided with teeth extending into the space between the lower set of cutters, so that the slitted strips of rubber can be taken from the opposite side of the machine and delivered to a suitable box. This arrangement prevents largely the clogging of the machine, as well as permitting the proper distribution of the rubber.

To economically receive the strips of cut rubber and provide a suitable receptacle for the same, I make a box M of the desired size and of rectangular shape and provide it with a number of partitions $m$, that form chambers $m'$, one for each of the strips of rubber as it issues from the machine. As the strips of rubber issue from the machine each one is led into one of the chambers above named, and, striking the bottom, it builds up a pile of rubber in a zigzag form. The providing of this box or receptacle with the rectangular chambers above alluded to provides a receptacle that may be used in combination with a rubber-slitting machine, so that the great difficulty hitherto encountered of disposing of the slitted rubber is removed and the use of machines for slitting rubber made commercially practical.

The advantages derived from the use of my machine are quite apparent from the foregoing description, taken in connection with the drawings, and are such as to enable me to do as much work with one machine as could formerly be done by from twenty to twenty-five men by hand labor, and not only reduce the cost of the product, but give a better resultant article.

I claim—

1. In a machine of the class described, the combination of a spindle, a set of circular cutters mounted thereon so as to have a common rotary motion but independent longitudinal motions, a second spindle arranged in line and parallel with the first spindle, a second set of cutters mounted on the second spindle so as to have a common rotary motion but independent longitudinal motions and adapted to enter the space formed by the opposite set of cutters, mechanism for adjusting the position of the cutters simultaneously and automatically, a set of comb-shaped strippers for stripping the strips of the cut material from one set of cutters and a second set of comb-shaped strippers for stripping the strips of material from the other set of cutters alternately to each side of the machine, and means for operating the parts, substantially as described.

2. In combination with a machine for cutting a sheet of rubber into narrow strips, a box provided with a multiplicity of rectangular chambers formed of and by a set or sets of partitions to receive the cut strips of rubber, substantially as described.

DANIEL W. BOSLEY.

Witnesses:
THOMAS F. SHERIDAN,
THOMAS B. McGREGOR.